US010706622B2

(12) United States Patent
Wang et al.

(10) Patent No.: US 10,706,622 B2
(45) Date of Patent: Jul. 7, 2020

(54) POINT CLOUD MESHING METHOD, APPARATUS, DEVICE AND COMPUTER STORAGE MEDIA

(71) Applicant: Alibaba Group Holding Limited, Grand Cayman (KY)

(72) Inventors: Bin Wang, Hangzhou (CN); Jingming Yu, Beijing (CN); Xiaoduan Feng, Hangzhou (CN); Pan Pan, Beijing (CN); Rong Jin, Sammamish, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/157,038

(22) Filed: Oct. 10, 2018

(65) Prior Publication Data
US 2019/0108679 A1 Apr. 11, 2019

(30) Foreign Application Priority Data
Oct. 11, 2017 (CN) .......................... 2017 1 0941538

(51) Int. Cl.
*G06T 17/20* (2006.01)
*G06T 7/33* (2017.01)
(52) U.S. Cl.
CPC ............ *G06T 17/205* (2013.01); *G06T 7/344* (2017.01); *G06T 17/20* (2013.01); *G06T 2207/10028* (2013.01)
(58) Field of Classification Search
CPC .................. G06T 17/205; G06T 7/344; G06T 2207/10028
See application file for complete search history.

(56) References Cited

U.S. PATENT DOCUMENTS

| 8,666,128 B2* | 3/2014 | Chaney ................ G06K 9/621 382/128 |
| 2002/0050988 A1* | 5/2002 | Petrov ..................... G06K 9/20 345/418 |
| 2003/0050726 A1* | 3/2003 | Jaffrey ............... G05B 19/4097 700/182 |
| 2013/0300740 A1* | 11/2013 | Snyder ................... G06F 3/016 345/420 |

(Continued)

OTHER PUBLICATIONS

The PCT Search Report arid Written Opinion dated Jan. 8, 2019 for PCT Application No. PCT/US2018/055301, 9 pages.

*Primary Examiner* — Michael Le
(74) *Attorney, Agent, or Firm* — Lee & Hayes, P.C.

(57) ABSTRACT

A method, an apparatus, a device and a computer storage media for point cloud meshing are provided. The method includes performing a mesh reconstruction on point cloud data corresponding to a target object to obtain a reconstruction model for characterizing a surface contour of the target object; performing image registration on the reconstruction model with respect to a standard model corresponding to the target object; determining a mesh portion in the registered reconstruction model that does not overlap with the standard model; and removing the determined mesh portion from the registered reconstruction model to obtain a resulting reconstruction model of the target object. The point cloud meshing method repairs a hole structure of an object surface without the need of post-editing manually, and thus is able to improve the efficiency of repairing the hole structure of the object surface.

17 Claims, 10 Drawing Sheets

(56) References Cited

U.S. PATENT DOCUMENTS

| | | |
|---|---|---|
| 2015/0371432 A1 | 12/2015 | Medioni et al. |
| 2016/0239631 A1* | 8/2016 | Wu ........................ A61C 7/002 |
| 2016/0314616 A1* | 10/2016 | Su ............................. G06T 7/90 |
| 2017/0046833 A1* | 2/2017 | Lurie ...................... G06T 19/20 |
| 2017/0109885 A1* | 4/2017 | Tang ....................... G06T 19/00 |
| 2017/0193699 A1 | 7/2017 | Mehr et al. |
| 2018/0225522 A1* | 8/2018 | Herrero Molina ... G06K 9/3241 |
| 2019/0028637 A1* | 1/2019 | Kolesov ............. G06K 9/00671 |
| 2019/0096135 A1* | 3/2019 | Dal Mutto ............ G06T 7/0006 |

\* cited by examiner

POINT CLOUD MESHING METHOD, APPARATUS, DEVICE AND COMPUTER STORAGE MEDIA

CROSS REFERENCE TO RELATED PATENT APPLICATIONS

This application claims priority to Chinese Patent Application No. 201710941538.6, filed on 11 Oct. 2017, entitled "Point Cloud Meshing Method, Apparatus, Device and Computer Storage Media," which are hereby incorporated by reference in its entirety.

TECHNICAL FIELD

The present disclosure relates to the technical field of image processing, and particularly to point cloud meshing methods, apparatuses, devices, and computer storage media.

BACKGROUND

In the fields of Virtual Reality (VR) and Augmented Reality (AR), real-world objects need to be modeled. In general, operations of modeling are to collect three-dimensional point cloud data of a real world object through a modeling scanning device, and to perform mesh processing to convert original discrete three-dimensional data into a continuous patch set. Mesh processing is a key procedure in model rendering and visualization. In addition, a meshed patch model can represent a true three-dimensional structure of an object in a better manner as compared to a discrete point cloud model. A point cloud refers to a point data set of a surface of an external appearance of an object obtained through a measuring instrument or a scanning instrument.

Current mesh processing algorithms form a sealed structure on a surface of an object. This has an advantage of maximizing the smoothness of the surface of the object while preserving original structural features of the object to the greatest extent. However, this will fill in a hole structure on the surface of the object, causing the object to be distorted. In order to preserve a hole structure on a surface of an object to avoid object distortion, existing methods are to manually edit a reconstruction model that is obtained after an object meshing process to repair a hole structure on the surface of the object.

However, the efficiency of using manual post-editing to repair a hole structure on a surface of an object is relatively low.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a method, an apparatus, a device, and a computer storage media for point cloud meshing, which can improve the efficiency of repairing a hole structure on a surface of an object.

In implementations, the embodiments of the present disclosure provide a point cloud meshing method. The method includes performing a mesh reconstruction on point cloud data corresponding to a target object to obtain a reconstruction model for characterizing a surface contour of the target object; performing image registration on the reconstruction model with respect to a standard model corresponding to the target object; determining a mesh portion in the registered reconstruction model that does not overlap with the standard model; and removing the determined mesh portion from the registered reconstruction model to obtain a resulting reconstruction model of the target object.

In implementations, the standard model is a generic appearance model of a type to which the target object belongs.

In implementations, performing mesh reconstruction on the point cloud data corresponding to the target object includes meshing and reconstructing the point cloud data corresponding to the target object based on a Poisson reconstruction algorithm.

In implementations, performing the image registration on the reconstruction model with respect to the standard model corresponding to the target object includes performing the image registration on the reconstruction model with respect to the standard model corresponding to the target object through texture features of a surface of the target object.

In implementations, performing the image registration on the reconstruction model with respect to the standard model corresponding to the target object includes performing the image registration on the reconstruction model with respect to the standard model corresponding to the target object through structural features of the target object.

In implementations, performing the image registration on the reconstruction model with respect to the standard model corresponding to the target object includes performing the image registration on the reconstruction model with respect to the standard model corresponding to the target object through reference points that are set on a surface of the target object.

In implementations, determining the mesh portion in the registered reconstruction model that does not overlap with the standard model includes setting a difference operation result that is obtained by performing a three-dimensional graphic Boolean operation on the registered reconstruction model and the standard model as the mesh portion of the registered reconstruction model that does not overlap with the standard model.

In implementations, the embodiments of present disclosure provide a point cloud meshing apparatus. The apparatus includes a reconstruction module used for performing a mesh reconstruction on point cloud data corresponding to a target object to obtain a reconstruction model for characterizing a surface contour of the target object; a registration module used for performing image registration on the reconstruction model with respect to a standard model corresponding to the target object; a determination module used for determining a mesh portion in the registered reconstruction model that does not overlap with the standard model; and a removal module used for removing the determined mesh portion from the registered reconstruction model to obtain a resulting reconstruction model of the target object.

In implementations, the reconstruction module is specifically used for meshing and reconstructing the point cloud data corresponding to the target object based on a Poisson reconstruction algorithm.

In implementations, the registration module is specifically used for performing the image registration on the reconstruction model with respect to the standard model corresponding to the target object through texture features of a surface of the target object.

In implementations, the registration module is specifically used for performing the image registration on the reconstruction model with respect to the standard model corresponding to the target object through structural features of the target object.

In implementations, the registration module is specifically used for performing the image registration on the reconstruction model with respect to the standard model corresponding to the target object through reference points that are set on a surface of the target object.

In implementations, the determination module is specifically used for setting a difference operation result that is obtained by performing a three-dimensional graphic Boolean operation on the registered reconstruction model and the standard model as the mesh portion of the registered reconstruction model that does not overlap with the standard model.

In implementations, the embodiments of the present disclosure provide a point cloud meshing device. The device includes memory and processor(s); the memory configured to store executable program codes; and the processor(s) configured to read the executable program codes stored in the memory to execute the point cloud meshing method provided by the embodiments of the present disclosure.

In implementations, the embodiments of the present disclosure provide a computer storage media. The computer storage media storing executable program instructions, the executable program instructions that, when executed by processor(s), implement the point cloud meshing method provided by the embodiments of the present disclosure.

The point cloud meshing method, apparatus, device, and computer storage media of the embodiments of the present disclosure do not need manual editing to repair a hole structure of an object surface at a later stage, and thus can improve the efficiency of repairing the hole structure of the object surface.

BRIEF DESCRIPTION OF THE DRAWINGS

In order to describe technical solutions of the embodiments of the present disclosure more clearly, accompanying drawings that are needed by the embodiments of the present disclosure are briefly described herein. Based on these accompanying drawings, one of ordinary skill in the art can obtain other drawings without making any creative effort.

DETAILED DESCRIPTION

Figure 1:
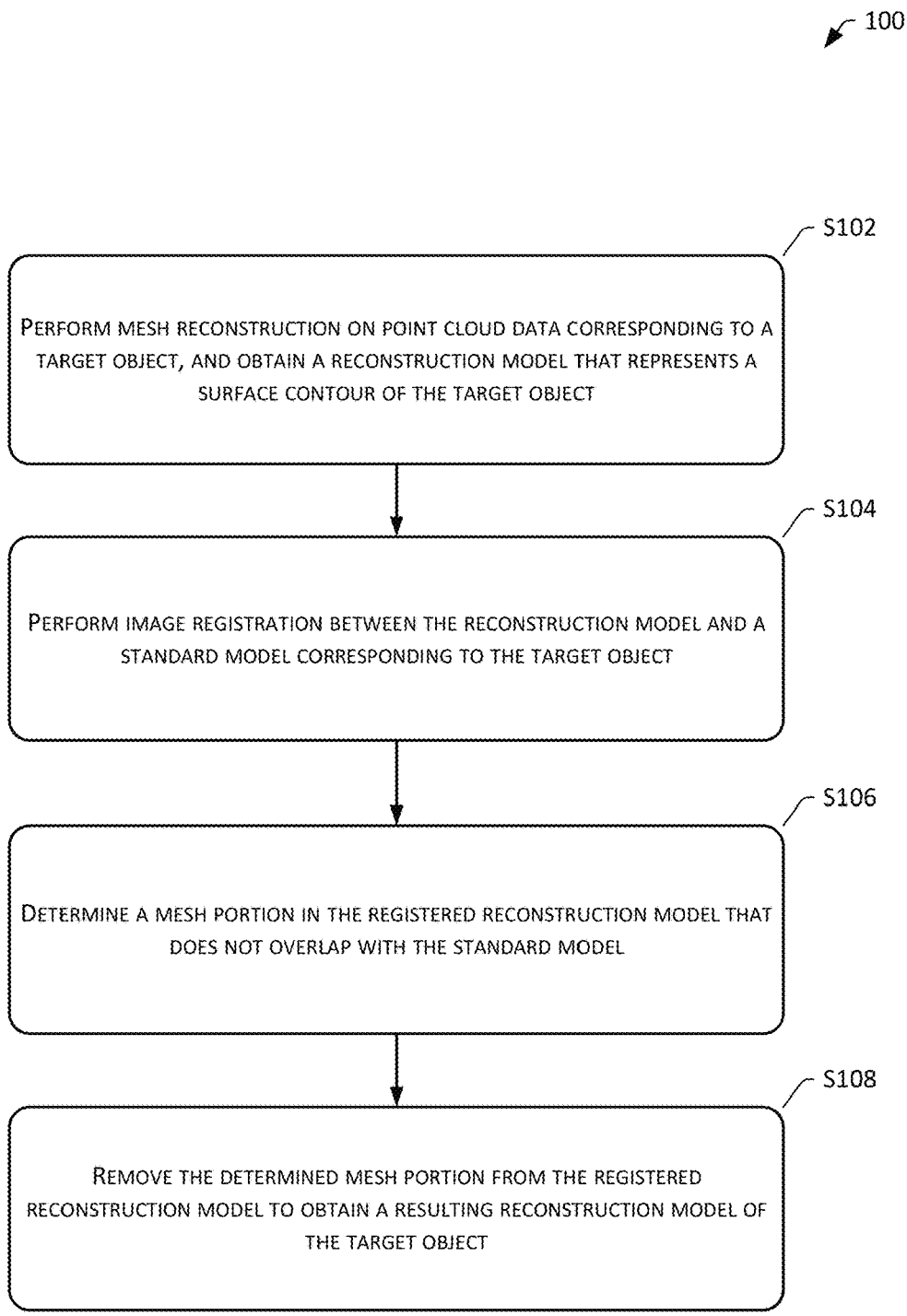
FIG. 1 shows a schematic flowchart of a point cloud meshing method in accordance with the embodiments of the present disclosure.

Features and illustrative embodiments of the present disclosure will be described in detail hereinafter. In order to make the goals, the technical solutions and the advantages of the present disclosure more understandable, the present disclosure will be described in further detail hereinafter with reference to the accompanying drawings and the embodiments. It should be understood that specific embodiments described herein are construed as only illustrating and not limiting the present disclosure. For one skilled in the art, the present disclosure may be implemented without the need of some of these specific details. The following description of the embodiments is merely used for providing a better understanding of the present disclosure through examples of the present disclosure.

It should be noted that relational terms such as first and second, etc. in the present context are used merely to distinguish one entity or operation from another entity or operation, and do not necessarily require or imply any type of such relationship or order between these entities or operations in practice. Furthermore, terms "including", "containing", or any other variants thereof are intended to encompass a non-exclusive inclusion, such that a process, method, article, or device including a series of elements includes not only those elements but also other elements that are not explicitly listed, or elements that are inherent to such process, method, article, or device. Without any further limitation, an element that is defined by a phrase "including" does not exclude the presence of additional elements in a process, method, article, or device that includes the element.

Existing reconstruction models obtained after meshing an object requires post-editing to repair a hole structure on a surface of the object manually. However, the efficiency of using of manual post-editing to repair a hole structure on a surface of the object is relatively low. Accordingly, the embodiments of the present disclosure provide a method, an apparatus, a device, and a computer storage media for point cloud meshing to improve the efficiency of repairing a hole structure on an object surface.

A point cloud meshing method provided by the embodiments of the present disclosure is first described in detail herein.

An idea of the point cloud meshing method provided by the embodiments of the present disclosure is to create a standard model of a class of objects in advance using computer-aided design software. After obtaining point cloud data of a target object, the point cloud data is meshed and reconstructed to obtain a sealed reconstruction model corresponding to the target object, and a model registration method is then used to perform registration between the sealed reconstruction model corresponding to the target object and a standard model of a type to which the target object belongs. Finally, the sealed reconstruction model is filtered using the standard model to reproduce a hole structure of the object.

FIG. 1 is a schematic flowchart diagram of a point cloud meshing method 100 according to the embodiments of the present disclosure. The method 100 may include the following operations.

S102: Perform mesh reconstruction on point cloud data corresponding to a target object, and obtain a reconstruction model that represents a surface contour of the target object.

According to specific methods used in a reconstruction process, mesh reconstruction algorithms can be divided into a Delaunay reconstruction method, a regional expansion and reconstruction method, an implicit reconstruction method, and a statistical reconstruction method.

According to the Delaunay reconstruction method, a strong mathematical basis is included, and a surface of an object can be accurately reconstructed in general. However, an amount of computations is relatively large. For objects with noise and sharp features, reconstruction using this method cannot achieve ideal results.

The regional expansion and reconstruction method generally starts from an initial seed and continues to expand to the surroundings until all data points are processed. The initial seed can be a triangular patch or an edge. The regional expansion and reconstruction method is simple, easy to implement, and efficient, and can handle reconstruction of complex topological models. However, the regional expansion and reconstruction method is not ideal for sharp feature reconstruction.

The implicit reconstruction method can effectively process noise data, but cannot effectively process models with sharp features. The implicit reconstruction method is generally used in computer vision and virtual reality only.

The statistical reconstruction method applies statistical learning and machine learning methods to mesh reconstruction.

In implementations, the above mesh reconstruction algorithms may be used for performing a mesh reconstruction on point cloud data corresponding to a target object.

For the sake of clarity of description, an embodiment is described herein as an illustrative example. In present embodiment, a mesh reconstruction is performed on point cloud data corresponding to a target object, and a Poisson reconstruction algorithm may be selected to perform a mesh reconstruction on the point cloud data corresponding to the target object. One skilled in the art can understand that other reconstruction algorithms may be used, and the content of the present embodiment should not be construed as limiting the essence of the present solution.

Based on the Poisson reconstruction algorithm, the point cloud data corresponding to the target object is meshed and reconstructed. The Poisson reconstruction algorithm or its derivative algorithm can be used to reconstruct the point cloud data corresponding to the target object.

A three-dimensional point cloud generated by an image is very noisy, sparse, and unevenly distributed. Even after diffusion processing, it is difficult to get a complete dense point cloud from a scene that does not have a rich texture. Due to the existence of these problems, a reconstruction algorithm needs to infer a topological structure of a surface, filter noise data, properly fill in holes, adjust sampling data, and divide a model network, etc. The Poisson reconstruction algorithm or its derivative algorithm can effectively solve the above problems. Therefore, the Poisson reconstruction algorithm or its derivative algorithm is used for performing surface reconstruction for a point cloud that is reconstructed from an image.

The Poisson reconstruction algorithm belongs to an implicit function method, and transforms a surface reconstruction of a directed point set into a spatial Poisson problem. The Poisson reconstruction algorithm adopts an implicit fitting method, and obtains an approximate representation of the model by estimating an indicator function of a model according to an integral relationship between a sampling point and the indicator function of the model, extracts an isosurface, and finally reconstructs seamless triangular approximation for the surface reconstruction.

S104: Perform image registration between the reconstruction model and a standard model corresponding to the target object.

A standard model is a general appearance model of a type to which the target object belongs. During registration, the standard model is used as a standard reference for the registration, and the reconstruction model after mesh reconstruction is registered with the standard model which acts as a reference.

A standard model, which acts as a general appearance model, is generally used for representing common shapes of objects of a same type. For example, a standard model of "shoes" is used for representing a general appearance shape of a shoes type such as shoes. A "mug" standard model is used for representing a general appearance of a cup type having a larger cup handle.

Using a standard model as a reference can take an example from a general appearance of a certain type of object, and then provide a reference for performing registration of a contour of a reconstruction model that is obtained.

After the target object is determined, a type of the target object can be determined, and a standard model corresponding to that type is then determined. The standard model is used for image registration.

In implementations, a standard model may be created in advance using computer-aided design software such as AutoCAD software, 3d MAX software, MeshLab software, and the like.

Image registration refers to a construction of a three-dimensional spatial transformation between a source model and a target model, so that the source model can maximize coincidence with the target model under such transformation.

A process of image registration may include performing feature extraction on two images to obtain feature points; obtaining matching feature point pairs by performing similarity measure; then obtaining image spatial coordinate transformation parameters through matching feature point pairs; and performing image registration based on image space spatial coordinate transformation parameters. The similarity measure is a measure that comprehensively assesses a degree of similarity between two objects. The closer the two objects are, the greater their measure of similarity is. The farther the two objects are, the smaller their measure of similarity is. Commonly used similarity measures are a correlation coefficient and a similarity coefficient. The correlation coefficient is used for measuring a degree of proximity between variables, and the similarity coefficient is used for measuring a degree of proximity between samples. Image space coordinate transformation parameters can be a transformation matrix between two images.

In implementations, methods adopted by the image registration may be an image grayscale registration method and an image feature-based registration method.

The image grayscale registration method first extracts a target region from a reference image as a registration template, and then move the template in an image to be registered to find a best matching point through a similarity measure (such as a correlation coefficient method, a square sum of differences method, an absolute value of differences method, a covariance method, etc.). Commonly used image grayscale registration methods include a cross-correlation method (which is also known as a template matching method), a sequential similarity detection matching method, and an interactive information method.

The image feature based registration method uses some salient features (points, lines, regions) in an image as primitives of registration. First, features such as points, lines, and regions having obvious changes in grayscale are extracted from two images to form a feature set. A feature matching algorithm is then used to select feature pairs having a correspondence relationship from the feature set corresponding to the two images as many as possible. Non-feature pixel points are processed by interpolation and the like to calculate a corresponding matching relationship, thereby realizing a pixel-by-pixel registration between the two images. Commonly used image features include feature points (which include corner points, points having high curvature, etc.), line segments, edges, contours, closed regions, feature structures, and statistical features (such as moment invariants, center of gravity).

Since situations such as errors in photographing and occlusion in a target object may exist when point cloud data of the target object is obtained by photographing the target object using a measuring instrument, the embodiments of the present disclosure can perform image registration between a reconstruction model and a standard model using an image feature-based registration method, such as an Iterative Closest Point (ICP) method. The feature-based image registration method can reduce the influence of noise in an extraction process of feature points, and has better adaptability to grayscale changes, image deformation and occlusion.

A process of image registration between a reconstruction model and a standard model using an ICP algorithm may include extracting feature points from the reconstruction model and the standard model, finding feature point pairs in the reconstruction model and the standard model, calculating respective distances between feature points in the feature point pairs, calculating a transformation matrix T to minimize a distance between the reconstruction model and the standard model, and using the transformation matrix T corresponding to a current distance to register the reconstruction model with the standard model to make the reconstruction model to overlap with a target model when the distance is smaller than a preset distance.

In implementations, performing the image registration between the reconstruction model and the standard model corresponding to the target object may include performing image registration between the reconstruction model and the standard model corresponding to the target object using texture features on a surface of the target object. Texture refers to a pattern of small shapes that are semi-periodically or regularly arranged in a certain scope in an image. Texture is used in image interpretation to indicate phenomena, such as uniformity, details, and roughness, etc., in images. Texture is one of the main features of image processing and pattern recognition. Texture features are changes in gray levels of an image that are related to spatial statistics. Texture features of images reflect properties of the images themselves and contribute to differentiation between the images.

In implementations, performing the image registration between the reconstruction model and the standard model corresponding to the target object may include performing the image registration between the reconstruction model and the standard model corresponding to the target object using structural features of the target object.

Structural features of an object include orientation information of faces formed by discrete points of a surface of an external appearance of the object and normal vector information of the discrete points.

When the reconstruction model and the standard model are registered using texture features or structural features, the surface of the object needs to have high-resolution texture feature information, or orientations of the surface formed by discrete points on the surface of the object and normal vector information of the discrete points, etc. Matching of key points on the surface of the object is implemented through an image feature detection and matching method of computer vision. A principle of three-dimensional planar homography or a basic matrix principle is then used to obtain a relative transformation relationship between the reconstruction model and the standard model, i.e., image spatial coordinate transformation parameters. And the image registration is then performed between the reconstruction model and the standard model according to the obtained relative transformation relationship.

Image feature detection and matching methods that are used for implementing the matching of the key points on the surface of the object may include Scale-Invariant Feature Transform (SIFT), Feature From Accelerated Segment Test (FAST), Normal Aligned Radial Feature (NARF), Speeded-Up Robust Features (SURF), Fast Approximate Nearest Neighbor Search Library Based Matcher (FlannBasedMatcher), and Brute Force Matcher (BruteForceMatcher, BFMatcher).

SIFT is an algorithm for detecting local features. This algorithm obtains features and performs matching of image feature points by finding feature points/key points and related descriptors in an image. SIFT feature matching may include two stages: a generation of SIFT features and a matching of SIFT feature vectors. The generation of SIFT features is an extraction of feature vectors that are independent of size scaling, rotation, and variations in brightness from multiple images.

The generation of SIFT features generally includes the following steps: 1) Construction of a scale space, detection of extreme points, and acquisition of scale invariance. 2) Feature point filtering and precise positioning. 3) Assignment of a direction value to a feature point. 4) Generation of a feature descriptor.

When SIFT feature vectors of two images are generated, a Euclidean distance of key feature vectors can be used as a similarity measure of key points in the two images. A certain key point of a first image is taken, and two closest points in a second image is found by traversing. These two key points are determined as a matching point pair if the nearest distance divided by the next nearest distance is less than a certain threshold.

The FAST feature point detection is a fast feature point detection method, and examines pixel values around a candidate point based on image gray values around the point. If there are enough pixels in an area around the candidate point that are sufficiently different from the candidate point in gray values, the candidate point is considered to be a feature point.

NARF is a local characterization algorithm. A process of extracting key points from images may include the following operations:

1. Traverse each depth image point and perform edge detection by finding a position with a depth change in a neighboring area.

2. Traverse each depth image point, and determine a coefficient measuring a surface change and a main direction of the change based on the surface change of the neighboring area.

3. Calculate a point of interest based on the main direction found in step 2, and characterize differences between the direction and other directions, and a change condition of that part of surface, i.e., how stable the point is.

4. Perform smoothing on the point of interest.

5. Perform a maximum value compression to find a final key point, i.e., a NARF key point.

On a basis of maintaining the characteristics of excellent performance of the SIFT algorithm, the SURF algorithm solves the shortcomings of high computational complexity and large consumption of time of SIFT, improves aspects such as extraction of points of interest and respective feature vector descriptors, and improves the speed of calculation.

FlannBasedMatcher finds a match-like nearest neighbor in a faster manner, and BFMatcher tries all possible matches to find the best match.

In computer vision, the homography of a plane is defined as a projection mapping from one plane to another plane. When a relative transformation relationship between the reconstruction model and the standard model is obtained using the homography principle, the relative transformation relationship that is obtained is a homography matrix between the reconstruction model and the standard model. The homography matrix associates positions of a set of points on a source image plane with positions of a set of points on a target image plane.

A basic matrix is a geometric relationship between two two-dimensional images obtained from two different viewpoints of a same three-dimensional scene. A type of geometrically polar constraint relationship exists between images of a same object in a same world coordinate system. In stereo vision, matching of image points can be utilized to restore this type of geometric relationship. When corresponding points between the reconstruction model and the standard model are obtained, a basic matrix can be recovered using a relationship between the corresponding points. The recovered basic matrix is a relative transformation relationship between the reconstruction model and the standard model.

In implementations, performing the image registration between the reconstruction model and the standard model corresponding to the target object may include performing the image registration between the reconstruction model and the standard model corresponding to the target object using reference points disposed on the surface of the target object.

The use of reference points for object matching mostly employs barcode information that is relatively easy to be detected and registered in the field of computer vision. A plurality of pieces of barcode information are disposed on or around the surface of the object to obtain landmark positions that can be used for registration in barcode images of the reconstruction model and the standard model. Mapping coefficient(s) between the reconstruction model and the standard model is/are determined using the landmark positions. The determined mapping coefficient(s) is/are used for registration between the reconstruction model and the standard model.

S106: Determine a mesh portion in the registered reconstruction model that does not overlap with the standard model.

Three-dimensional graphics Boolean operations include a union operation, an intersection operation, and a difference operation. In an image processing operation, a new object form can be obtained by performing a Boolean operation on two or more than two objects. Accordingly, in implementations, determining the mesh portion in the reconstruction model that does not overlap with the standard model may include performing a three-dimensional graphical Boolean operation on the registered reconstruction model and the standard model, and setting a difference operation result obtained thereby as the mesh portion in the reconstruction model that does not overlap with the standard model.

S108: Remove the determined mesh portion from the registered reconstruction model to obtain a resulting reconstruction model of the target object.

The point cloud meshing method provided by the embodiments of the present disclosure is described hereinafter with reference to specific examples.

Figure 2:
FIG. 2 shows a schematic diagram of a target object in accordance with the embodiments of the present disclosure.
Figure 3:
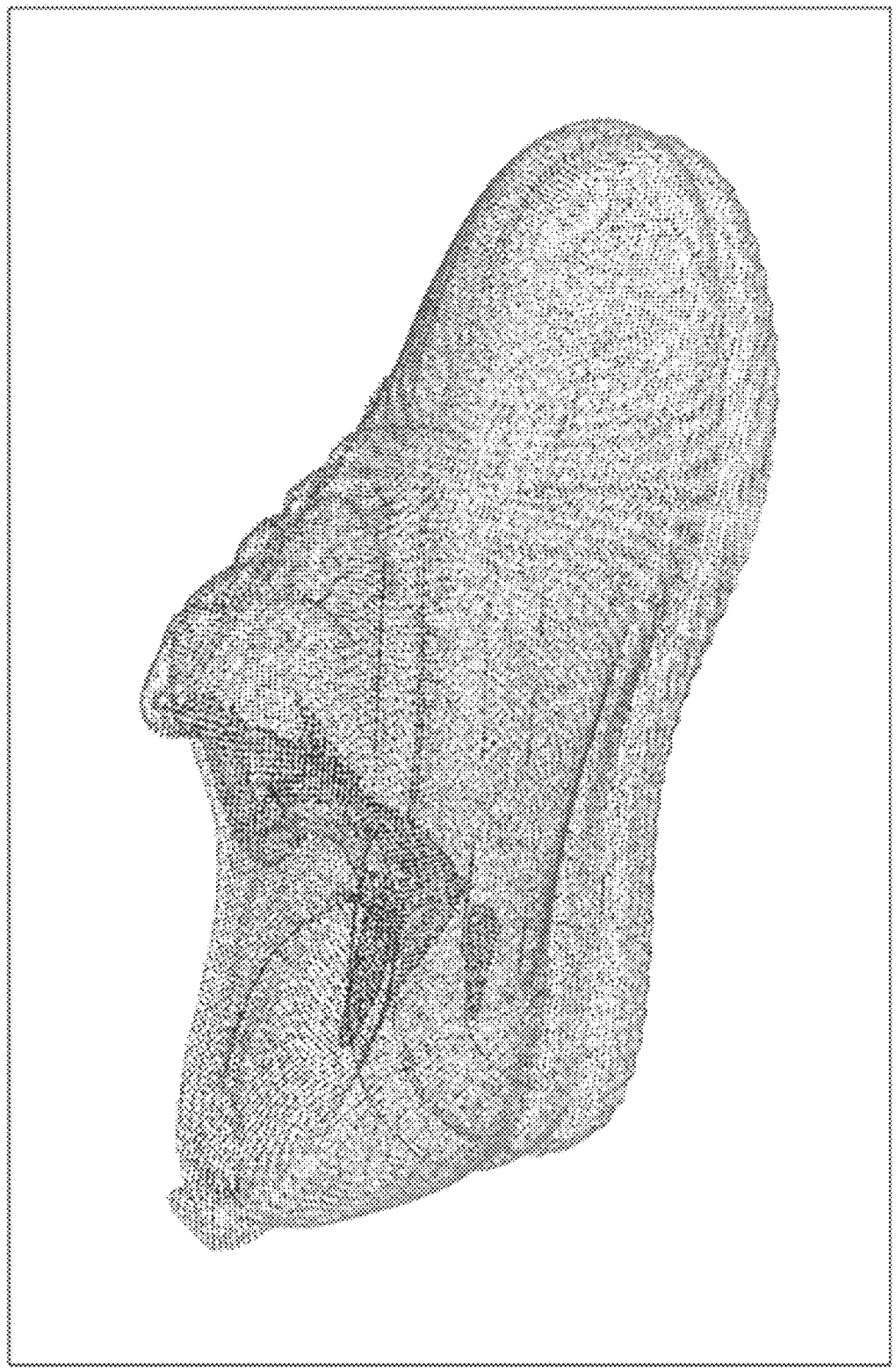
FIG. 3 shows a schematic diagram of point cloud data corresponding to a target object in accordance with the embodiments of the present disclosure.
Figure 4:
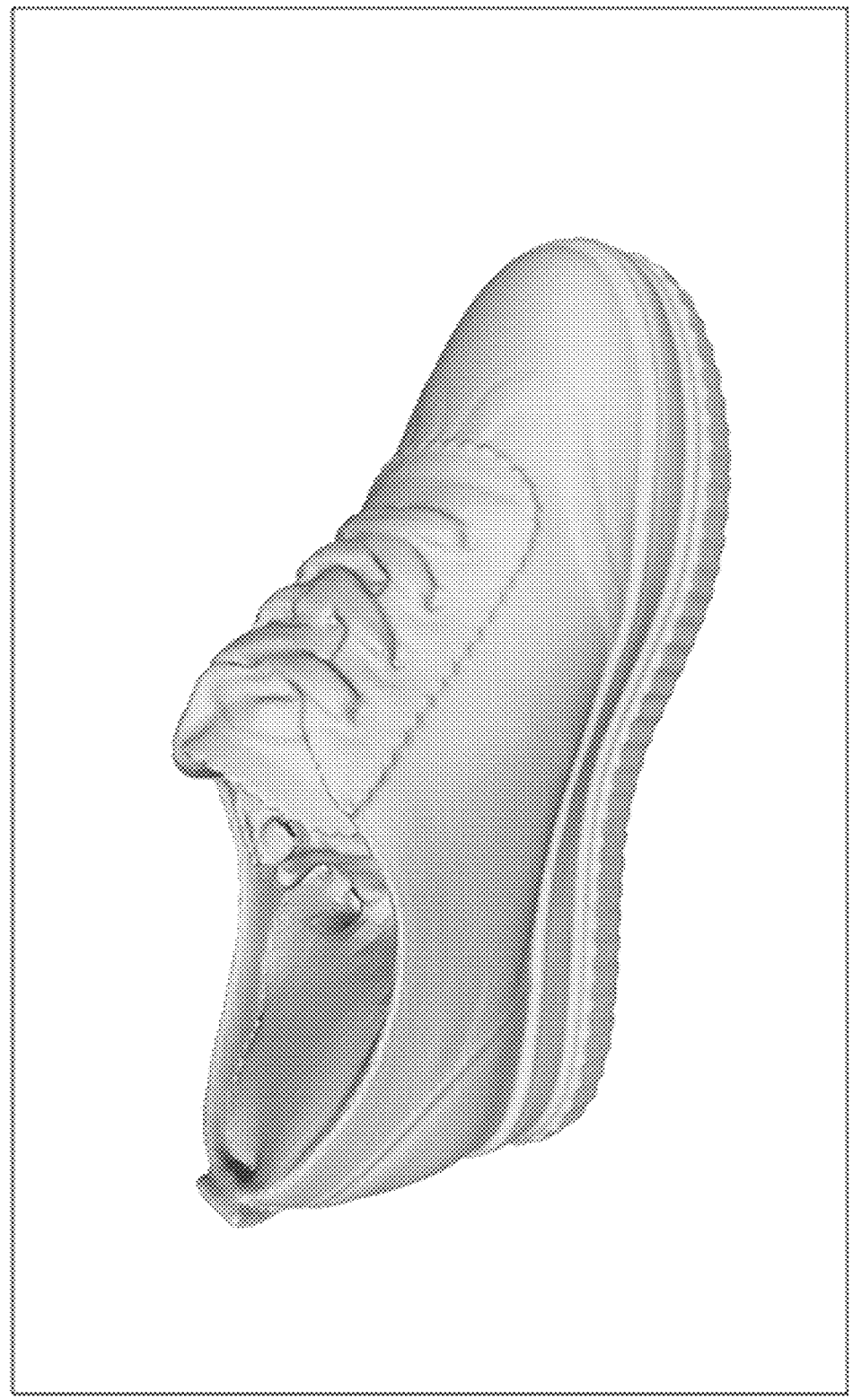
FIG. 4 shows a schematic diagram of a reconstruction model obtained from meshing and reconstructing point cloud data corresponding to a target object in accordance with the embodiments of the present disclosure.

A target object is assumed to be a shoe as shown in FIG. 2. FIG. 2 shows a schematic diagram of a target object 200 in accordance with the embodiments of the present disclosure. Point cloud data corresponding to the shoe is shown in FIG. 3. FIG. 3 is a schematic diagram of point cloud data 300 corresponding to a target object in accordance with the embodiments of the present disclosure. After mesh reconstruction of the point cloud data shown in FIG. 3, a reconstruction model of the shoe is obtained as shown in FIG. 4. FIG. 4 shows a schematic diagram of a resulting reconstruction model 400 obtained by mesh reconstruction of point cloud data corresponding to a target object in accordance with the embodiments of the present disclosure. Since situations such as photographing errors and occlusion of the shoe may exist when the shoe is photographed by a measuring instrument, this results in an existence of a reconstruction error in the reconstruction model obtained from the mesh reconstruction of the point cloud data as shown in FIG. 4. As can be seen in FIG. 4, deformations and abnormal depressions exist in a modeling result at a portion framed with a broken line in an inner side of the shoe. These do not conform to a physical structure of an interior bottom surface of an actual shoe type, and modeling errors exist. Through the Applicant's analysis, these modeling errors in the present example are due to the impact of an open portion of the shoe type on a scanning operation of a modeling scanning device (e.g., abnormally blocking a collected light, reflecting an incorrectly collected light, etc.). Therefore, in a modeling process of other objects, it is inferred that errors will also occur in the modeling process due to external shapes of the objects, leading to failures of modeling models of the objects in truly representing the shapes of the objects, and occurrences of distortions.

In order to avoid modeling errors and accurately reproduce an appearance shape of an object (for example, an opening structure of the shoe needs to be reproduced accurately in the present example), the Applicant creatively proposes to perform image registration between a reconstruction model and a standard model. A mesh portion in the reconstruction model that does not overlap with the standard model can be removed, thereby eliminating errors.

Figure 5:
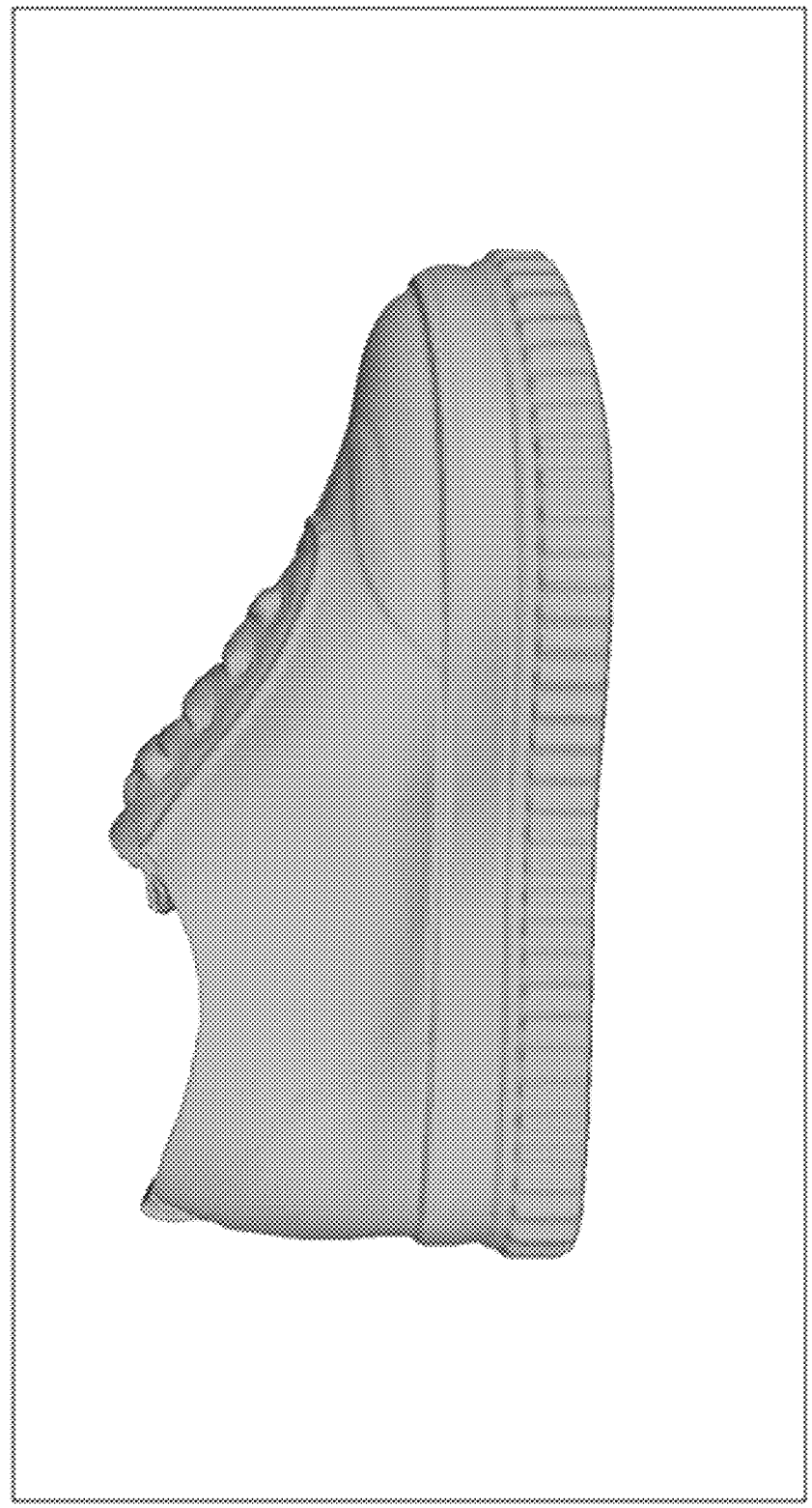
FIG. 5 shows a schematic diagram of a standard model corresponding to a target object in accordance with the embodiments of the present disclosure.

The shoe shown in FIG. 2 belongs to a flat shoe. A standard model corresponding to the flat shoes is shown in FIG. 5, and the standard model shown in FIG. 5 is the standard model corresponding to the shoe shown in FIG. 2. FIG. 5 shows a schematic diagram of a standard model 500 corresponding to a target object in accordance with the embodiments of the present disclosure.

Image registration is performed between the reconstruction model shown in FIG. 4 and the standard model shown in FIG. 5 using an ICP registration algorithm or a modified ICP registration algorithm. The registration is to map a structural part of the reconstruction model onto the standard model to determine a "part" of the structural part of the reconstruction model under a real object (the standard model). For example, if an upper part of the shoe of the reconstruction model is mapped into an upper part of the shoe of the standard model, this part is determined to be "upper part of shoe". However, an erroneous modeling part in an inner side of the shoe of the reconstruction model is mapped to an opening part of the shoe of the standard model, and a determination is made that this erroneous modeling part should not exist. As such, this non-overlapping, i.e., incorrect mapping, portion is removed at a later step. A pore structure of the shoe can be reproduced by removing this non-overlapping portion of the shoe.

Figure 6:
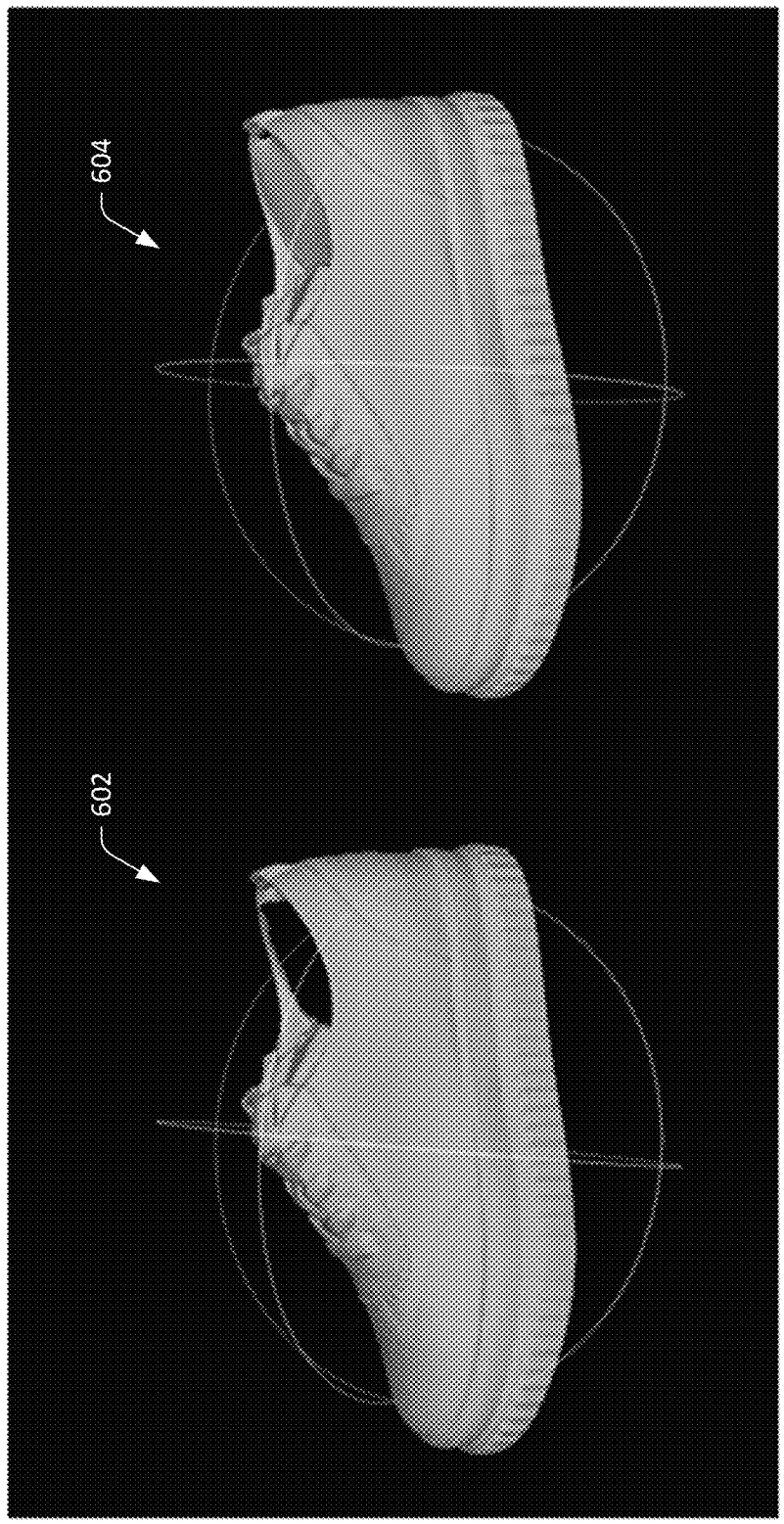
FIG. 6 shows a schematic diagram of a process of registering a reconstruction model with a standard model in accordance with the embodiments of the present disclosure.
Figure 7:
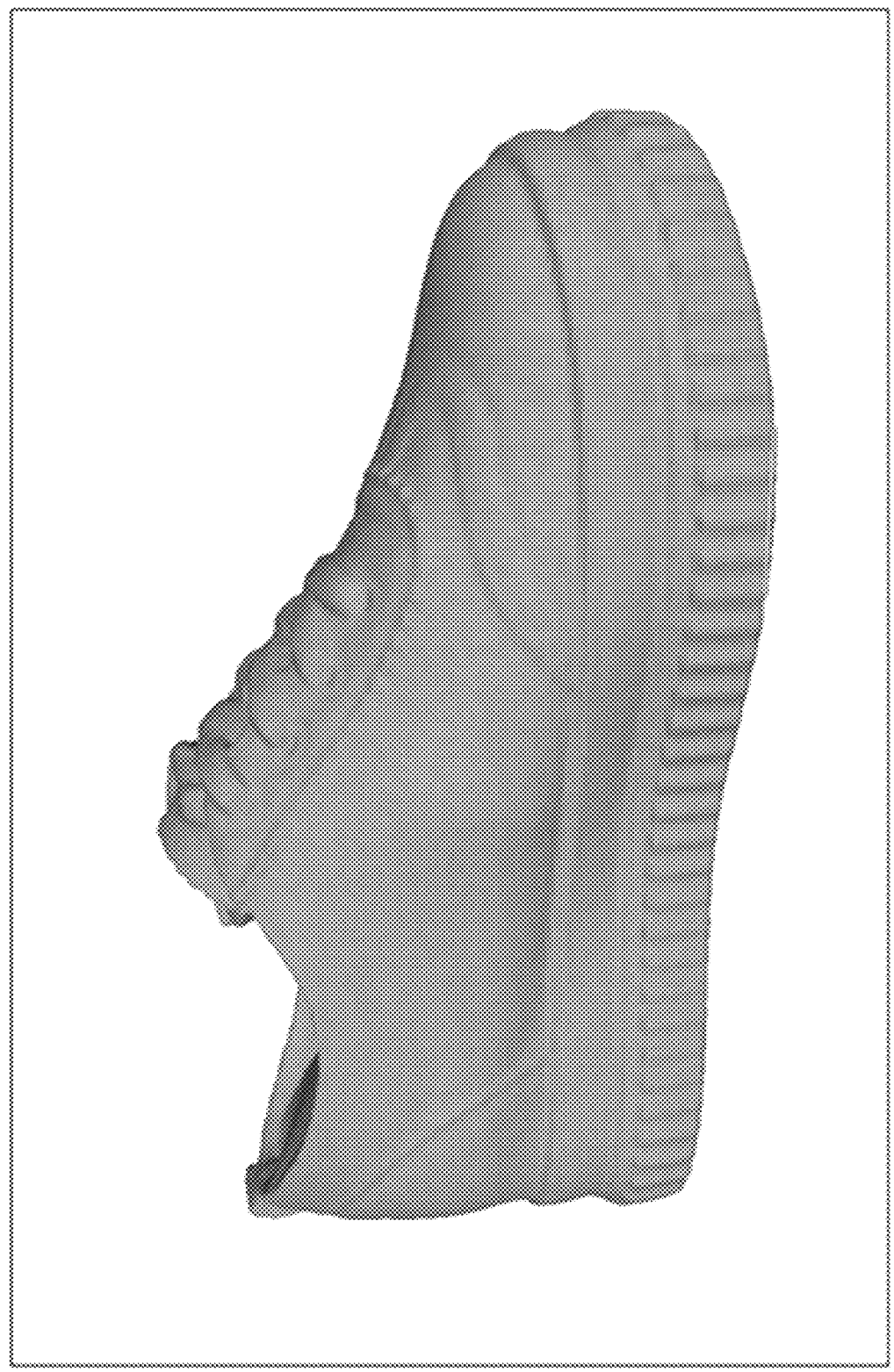
FIG. 7 shows a schematic diagram of a result of registering a reconstruction model with a standard model in accordance with the embodiments of the present disclosure.

FIG. 6 is a schematic diagram of a process of registration 600 between a reconstruction model and a standard model in accordance with the embodiments of the present disclosure. The left side of FIG. 6 is a general appearance model 602 of a flat shoe to which the shoe shown in FIG. 2 belongs, i.e., a standard model. The right side of FIG. 6 is a reconstruction model 604 of the shoe shown in FIG. 2. A registration result is shown in FIG. 7. FIG. 7 is a schematic diagram showing a result 700 of registration between the reconstruction model and the standard model in accordance with the embodiments of the present disclosure. As can be seen from FIG. 7, the reconstruction model is attached to the standard model.

A three-dimensional graphics Boolean operation is then used to calculate a difference set result between the registered reconstruction model and the standard model, and mesh portion(s) of the registered reconstruction model that do(es) not overlap with the standard model is/are determined.

Figure 8:
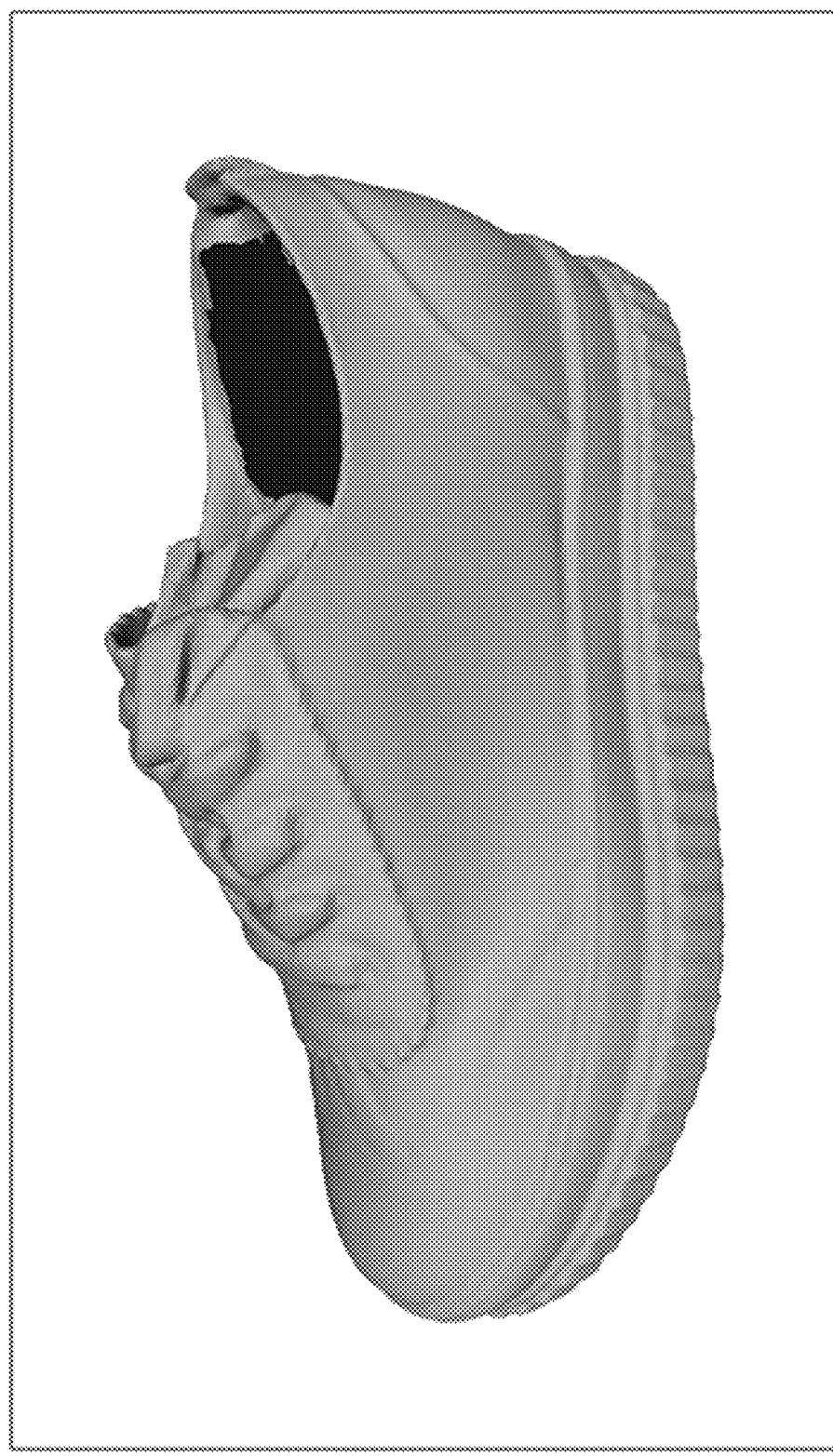
FIG. 8 shows a schematic diagram of a resulting reconstruction model after removing a mesh portion in accordance with the embodiments of the present disclosure.

The determined mesh portion(s) is/are removed from the registered reconstruction model to obtain a resulting reconstruction model of the shoe as shown in FIG. 8. FIG. 8 shows a schematic diagram of a resulting reconstruction model 800 obtained by removing mesh portion(s) in accordance with the embodiments of the present disclosure. The resulting reconstruction model shown in FIG. 8 retains a pore structure of the shoe shown in FIG. 2 to avoid distortion.

It should be noted that the above description of the shoe is merely an example of the present disclosure and is not intended to limit the present disclosure.

The point cloud meshing method of the embodiments of the invention can repair a hole structure on a surface of an object without post-editing manually, and can improve the efficiency of repairing the hole structure on the surface of the object.

Corresponding to the foregoing method embodiment, the embodiments of the present disclosure further provide a point cloud meshing apparatus.

Figure 9:
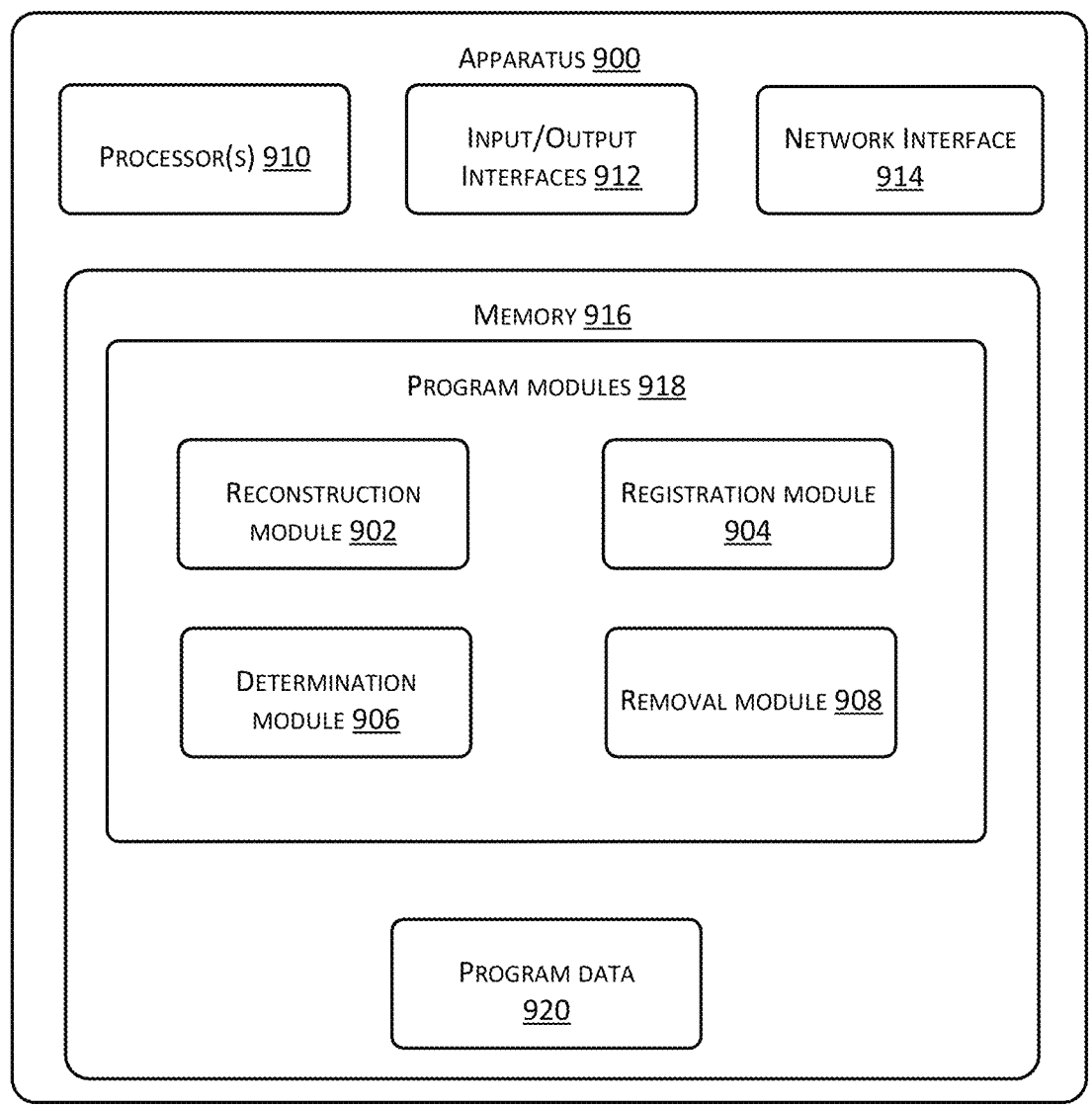
FIG. 9 shows a schematic structural diagram of a point cloud meshing apparatus in accordance with the embodiments of the present disclosure.

FIG. 9 shows a schematic structural diagram of a point cloud meshing apparatus 900 in accordance with the embodiments of the present disclosure. In implementations, the apparatus 900 may include one or more computing devices. In implementations, the apparatus 900 may be a part of one or more computing devices, e.g., implemented or run by the one or more computing devices. In implementations, the one or more computing devices may be located in a single place or distributed among a plurality of network devices over a network.

By way of example and not limitation, the apparatus 900 may include a reconstruction module 902 used for performing a mesh reconstruction on point cloud data corresponding to a target object to obtain a reconstruction model for characterizing a surface contour of the target object; a registration module 904 used for performing image registration on the reconstruction model with respect to a standard model corresponding to the target object; a determination module 906 used for determining mesh portion(s) in the registered reconstruction model that do(es) not overlap with the standard model; and a removal module 908 used for removing the mesh portion(s) determined by the determination module 906 from the registered reconstruction model to obtain a resulting reconstruction model of the target object.

In implementations, the standard model is a generic appearance model of a type to which the target object belongs.

In implementations, the reconstruction module 902 may specifically be used for meshing and reconstructing the point cloud data corresponding to the target object based on a Poisson reconstruction algorithm.

In implementations, the registration module 904 may specifically be used for performing the image registration on the reconstruction model with respect to the standard model corresponding to the target object through texture features of a surface of the target object.

In implementations, the registration module 904 may specifically be used for performing the image registration on the reconstruction model with respect to the standard model corresponding to the target object through structural features of the target object.

In implementations, the registration module 904 may specifically be used for performing the image registration on the reconstruction model with respect to the standard model corresponding to the target object through reference points that are set on a surface of the target object.

In implementations, the determination module 906 may specifically be used for setting a difference operation result that is obtained by performing a three-dimensional graphic Boolean operation on the registered reconstruction model and the standard model as the mesh portion(s) of the registered reconstruction model that do(es) not overlap with the standard model.

In implementations, the apparatus 900 may include one or more processors 910, an input/output (I/O) interface 912, a network interface 914, and memory 916.

The memory 916 may include a form of computer readable media such as a volatile memory, a random access memory (RAM) and/or a non-volatile memory, for example, a read-only memory (ROM) or a flash RAM. The memory 916 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 916 may include program modules 918 and program data 920. The program modules 918 may include one or more of the modules as described in the foregoing description and FIG. 9.

The point cloud meshing apparatus of the embodiments of the present disclosure can repair a hole structure on a surface of an object without post-editing manually, and can improve the efficiency of repairing the hole structure on the surface of the object.

Due to its basic similarities to the method embodiment, the description of the apparatus embodiment is relatively simple, and reference can be made to the description of related parts of the method embodiment.

Figure 10:
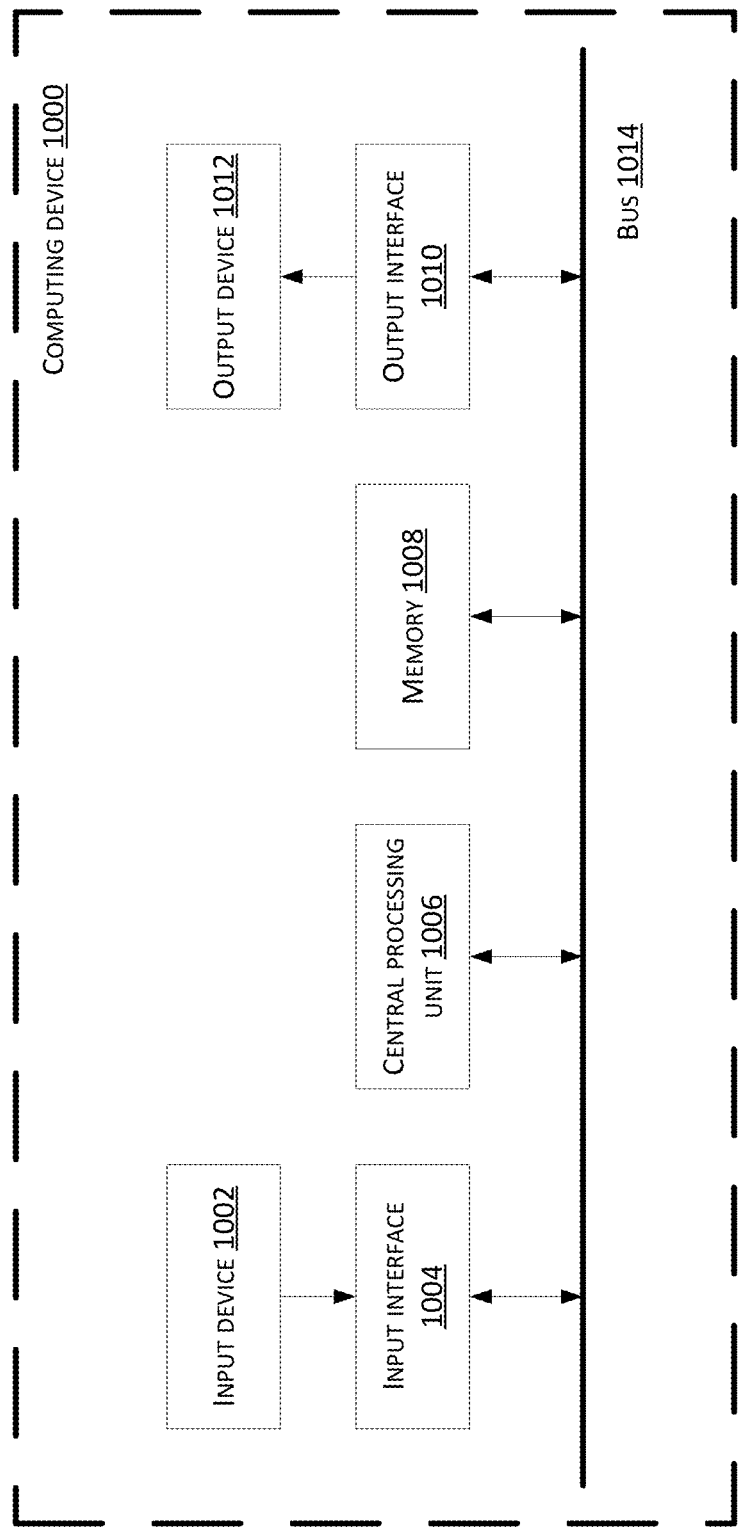
FIG. 10 shows a schematic structural diagram of a point cloud meshing device in accordance with the embodiments of the present disclosure.

FIG. 10 is a structural diagram showing exemplary hardware architecture of a computing device 1000 capable of implementing the method and the apparatus for point cloud meshing in accordance with the embodiments of the present disclosure. As shown in FIG. 10, the computing device 1000 includes an input device 1002, an input interface 1004, a central processing unit 1006, memory 1008, an output interface 1010, and an output device 1012. The input interface 1004, the central processing unit 1006, the memory 1008, and the output interface 1010 are connected to each other through a bus 1014. The input device 1002 and the output device 1012 are connected to the bus 1014 through the input interface 1004 and the output interface 1010 respectively, and thereby connected to the other components of the computing device 1014.

Specifically, the input device 1002 receives input information from outside and transmits the input information to the central processing unit 1006 through the input interface 1004. The central processing unit 1006 processes the input information based on computer executable instructions stored in the memory 1008 to generate output information. The output information is temporarily or permanently stored in the memory 1008. The output information is then transmitted to the output device 1012 via the output interface 1010. The output device 1012 outputs the output information to the outside of the computing device 1000 for use by a user.

In other words, the computing device shown in FIG. 10 can also be implemented as a point cloud meshing processing device. The point cloud meshing processing device may include memory storing computer executable instructions, and processor(s), the processor(s), when executing the computer executable instructions, implementing the method and the apparatus for point cloud meshing that are described in conjunction with FIGS. 1-9.

The embodiments of the present disclosure further provide a computer storage media. The computer storage media stores executable program instructions. The executable program instructions, when executed by processor(s), implement the point cloud meshing method provided by the embodiments of the present disclosure.

It is noted that the present disclosure is not limited to the specific configurations and processes that are described in the foregoing and shown in the drawings. For the sake of brevity, a detailed description of known methods is omitted herein. In the foregoing embodiments, a number of specific steps have been described and illustrated as examples. However, the methods of the present disclosure are not limited to the specific steps that are described and illustrated. One skilled in the art can make various changes, modifications and additions, or change an order between steps after understanding the spirit of the present disclosure.

Functional blocks that are shown in the above structural block diagrams may be implemented as hardware, software, firmware, or a combination thereof, and can be, for example, an electronic circuit, an application specific integrated circuit (ASIC), suitable firmware, plug-ins, function cards, etc., when implemented in a form of hardware. When implemented in a form of software, elements of the present disclosure are programs or code segments that are used for performing required tasks. The programs or code segments can be stored in a machine readable media or transmitted over a transmission media or a communication link through a data signal carried in a carrier. A "machine readable media" can include any media that can store or transmit information. Examples of machine readable media include an electronic circuit, a semiconductor memory device, ROM, flash memory, erasable ROM (EROM), a floppy disk, CD-ROM, an optical disk, a hard disk, fiber optic media, a radio frequency (RF) link, and the like. The code segments can be downloaded via a computer network such as the Internet, an intranet, and the like.

It should also be noted that the exemplary embodiments described in the present disclosure describe some methods or systems based on a series of steps or apparatuses. However, the present disclosure is not limited to an order of the above steps. In other words, the steps may be performed in an order mentioned in the embodiment, or may be different from the order in the embodiment, or a number of steps may be performed simultaneously.

The above description is only specific embodiments of the present disclosure. One skilled in the art can clearly understand that specific working processes of the systems, modules and units described above can be referenced to corresponding processes of the foregoing method embodiments, and are not repeatedly described herein for convenience and brevity of the description. It should be understood that the scope of the present disclosure is not limited thereto. Any technical persons familiar with the current technical field can easily conceive equivalent modifications or replacements within the technical scope revealed by the present disclosure. These modifications or replacements should be covered within the scope of protection of the present disclosure.

The present disclosure can be further understood using the following clauses.

Clause 1: A point cloud meshing method comprising: performing a mesh reconstruction on point cloud data corresponding to a target object to obtain a reconstruction model for characterizing a surface contour of the target object; performing image registration between the reconstruction model and a standard model corresponding to the target object; determining a mesh portion in the registered reconstruction model that does not overlap with the standard model; and removing the determined mesh portion from the registered reconstruction model to obtain a resulting reconstruction model of the target object.

Clause 2: The method of Clause 1, wherein the standard model is a generic appearance model of a type to which the target object belongs.

Clause 3: The method of Clause 1, wherein performing mesh reconstruction on the point cloud data corresponding to the target object comprises meshing and reconstructing the point cloud data corresponding to the target object based on a Poisson reconstruction algorithm.

Clause 4: The method of Clause 1, wherein performing the image registration between the reconstruction model and the standard model corresponding to the target object comprises performing the image registration on the reconstruction model with respect to the standard model corresponding to the target object through texture features of a surface of the target object.

Clause 5: The method of Clause 1, wherein performing the image registration between the reconstruction model and the standard model corresponding to the target object comprises performing the image registration on the reconstruction model with respect to the standard model corresponding to the target object through structural features of the target object.

Clause 6: The method of Clause 1, wherein performing the image registration between the reconstruction model and the standard model corresponding to the target object comprises performing the image registration on the reconstruction model with respect to the standard model corresponding to the target object through reference points that are set on a surface of the target object.

Clause 7: The method of Clause 1, wherein determining the mesh portion in the registered reconstruction model that does not overlap with the standard model comprises setting a difference operation result that is obtained by performing a three-dimensional graphic Boolean operation on the registered reconstruction model and the standard model as the mesh portion of the registered reconstruction model that does not overlap with the standard model.

Clause 8: A point cloud meshing apparatus comprising: a reconstruction module used for performing a mesh reconstruction on point cloud data corresponding to a target object to obtain a reconstruction model for characterizing a surface contour of the target object; a registration module used for performing image registration between the reconstruction model and a standard model corresponding to the target object; a determination module used for determining a mesh portion in the registered reconstruction model that does not overlap with the standard model; and a removal module used for removing the determined mesh portion from the registered reconstruction model to obtain a resulting reconstruction model of the target object.

Clause 9: The apparatus of Clause 8, wherein the reconstruction module is used for meshing and reconstructing the point cloud data corresponding to the target object based on a Poisson reconstruction algorithm.

Clause 10: The apparatus of Clause 8, wherein the registration module is used for performing the image registration between the reconstruction model and the standard model corresponding to the target object through texture features of a surface of the target object.

Clause 11: The apparatus of Clause 8, wherein the registration module is used for performing the image registration between the reconstruction model and the standard model corresponding to the target object through structural features of the target object.

Clause 12: The apparatus of Clause 8, wherein the registration module is used for performing the image registration between the reconstruction model and the standard model corresponding to the target object through reference points that are set on a surface of the target object.

Clause 13: The apparatus of Clause 8, wherein the determination module is used for setting a difference operation result that is obtained by performing a three-dimensional graphic Boolean operation on the registered reconstruction model and the standard model as the mesh portion of the registered reconstruction model that does not overlap with the standard model.

Clause 14: A point cloud meshing device comprising: memory; and processor(s), the memory configured to store executable program codes, and the processor(s) configured to read the executable program codes stored in the memory to execute the point cloud meshing method of any one of Clauses 1-7.

Clause 15: A computer storage media storing executable program instructions, the executable program instructions that, when executed by processor(s), implement the point cloud meshing method of any one of Clauses 1-7.

What is claimed is:

1. A method implemented by one or more computing devices, the method comprising:
    performing a mesh reconstruction on point cloud data corresponding to a target object to obtain a reconstruction model for characterizing a surface contour of the target object;
    determining a type of the target object;
    determining a standard model of the target object based on the type of the target object;
    performing image registration between the reconstruction model and the standard model;
    determining a mesh portion in the registered reconstruction model that does not overlap with the standard model by setting a difference operation result that is obtained by performing a three-dimensional graphic Boolean operation on the registered reconstruction model and the standard model as the mesh portion of the registered reconstruction model that does not overlap with the standard model; and
    removing the determined mesh portion from the registered reconstruction model to obtain a resulting reconstruction model of the target object.

2. The method of claim 1, wherein the standard model is a generic appearance model of the type to which the target object belongs.

3. The method of claim 1, wherein performing mesh reconstruction on the point cloud data corresponding to the target object comprises meshing and reconstructing the point cloud data corresponding to the target object based on a Poisson reconstruction algorithm.

4. The method of claim 1, wherein performing the image registration between the reconstruction model and the standard model comprises performing the image registration on the reconstruction model with respect to the standard model through texture features of a surface of the target object.

5. The method of claim 1, wherein performing the image registration between the reconstruction model and the standard model comprises performing the image registration on the reconstruction model with respect to the standard model through structural features of the target object.

6. The method of claim 1, wherein performing the image registration between the reconstruction model and the standard model comprises performing the image registration on the reconstruction model with respect to the standard model through reference points that are set on a surface of the target object.

7. An apparatus comprising:
    one or more processors;
    memory;
    a reconstruction module stored in the memory and executable by the one or more processors to perform a mesh reconstruction on point cloud data corresponding to a target object to obtain a reconstruction model for characterizing a surface contour of the target object;
a registration module in the memory and executable by the one or more processors to:
determine a type of the target object,
determine a standard model of the target object based on the type of the target object,
perform image registration between the reconstruction model and the standard model;
a determination module in the memory and executable by the one or more processors to determine a mesh portion in the registered reconstruction model that does not overlap with the standard model, the determination module used for setting a difference operation result that is obtained by performing a three-dimensional graphic Boolean operation on the registered reconstruction model and the standard model as the mesh portion of the registered reconstruction model that does not overlap with the standard model; and
a removal module in the memory and executable by the one or more processors to remove the determined mesh portion from the registered reconstruction model to obtain a resulting reconstruction model of the target object.

8. The apparatus of claim 7, wherein the reconstruction module is used for meshing and reconstructing the point cloud data corresponding to the target object based on a Poisson reconstruction algorithm.

9. The apparatus of claim 7, wherein the registration module is used for performing the image registration between the reconstruction model and the standard model corresponding to the target object through texture features of a surface of the target object.

10. The apparatus of claim 7, wherein the registration module is used for performing the image registration between the reconstruction model and the standard model corresponding to the target object through structural features of the target object.

11. The apparatus of claim 7, wherein the registration module is used for performing the image registration between the reconstruction model and the standard model corresponding to the target object through reference points that are set on a surface of the target object.

12. One or more computer readable media storing executable instructions that, when executed by one or more processors, cause the one or more processors to perform acts comprising:

performing a mesh reconstruction on point cloud data corresponding to a target object to obtain a reconstruction model for characterizing a surface contour of the target object;
determining a type of the target object;
determining a standard model of the target object based on the type of the target object;
performing image registration between the reconstruction model and the standard model;
determining a mesh portion in the registered reconstruction model that does not overlap with the standard model by setting a difference operation result that is obtained by performing a three-dimensional graphic Boolean operation on the registered reconstruction model and the standard model as the mesh portion of the registered reconstruction model that does not overlap with the standard model; and
removing the determined mesh portion from the registered reconstruction model to obtain a resulting reconstruction model of the target object.

13. The one or more computer readable media of claim 12, wherein the standard model is a generic appearance model of the type to which the target object belongs.

14. The one or more computer readable media of claim 12, wherein performing mesh reconstruction on the point cloud data corresponding to the target object comprises meshing and reconstructing the point cloud data corresponding to the target object based on a Poisson reconstruction algorithm.

15. The one or more computer readable media of claim 12, wherein performing the image registration between the reconstruction model and the standard model comprises performing the image registration on the reconstruction model with respect to the standard model through texture features of a surface of the target object.

16. The one or more computer readable media of claim 12, wherein performing the image registration between the reconstruction model and the standard model comprises performing the image registration on the reconstruction model with respect to the standard model through structural features of the target object.

17. The one or more computer readable media of claim 12, wherein performing the image registration between the reconstruction model and the standard model comprises performing the image registration on the reconstruction model with respect to the standard model through reference points that are set on a surface of the target object.

* * * * *